Patented Apr. 22, 1924.

1,491,390

UNITED STATES PATENT OFFICE.

WALTER GLAESER, OF BROOKLYN, NEW YORK.

MANUFACTURE OF SODIUM CITRATE.

No Drawing.  Application filed February 9, 1920. Serial No. 357,292.

*To all whom it may concern:*

Be it known that I, WALTER GLAESER, a citizen of the United States, and a resident of Brooklyn, county of Kings, and State of New York, have invented a new and useful Improvement in the Manufacture of Sodium Citrate, of which the following is a specification; the principle of the invention being herein explained and the best mode in which I have contemplated applying that principle, so as to distinguish it from other inventions.

The present invention, relating, as indicated, to the manufacture of sodium citrate, is directed to an improved method involving a single operation and the use of relatively inexpensive reagents. To the accomplishment of the foregoing and related ends, said invention, then, consists of the means hereinafter fully described and particularly pointed out in the claims.

The following description sets forth in detail one approved method of carrying out the invention, such disclosed mode, however, constituting but one of the various ways in which the principle of the invention may be used.

Sodium citrate is ordinarily made by dissolving soda in citric acid, which requires of course that citric acid be made first, and the manufacture of this compound is expensive. The present invention is based upon my discovery that calcium citrate is completely decomposed when treated in the cold by an aqueous solution of an alkali metal salt, such as sodium carbonate. It is essential that the treatment be carried on at a low temperature, which should be below 30° C., and it is desirable that there be present a small amount of ammonia as this assists the double decomposition for the reason that calcium citrate is soluble in ammonia.

The reactions which take place when calcium citrate is thus created in the cold with sodium carbonate are indicated in the following equations, and produce sodium citrate and calcium carbonate.

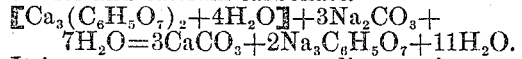

$$[Ca_3(C_6H_5O_7)_2 + 4H_2O] + 3Na_2CO_3 + 7H_2O = 3CaCO_3 + 2Na_3C_6H_5O_7 + 11H_2O.$$

It is not necessary to use sodium carbonate, as other alkali metal salts, such as sodium sulphate or sodium bisulphate or phosphate may be used to effect the same decomposition of calcium citrate.

Calcium citrate occurs in nature in small quantities, but is usually manufactured by neutralizing the juice of lemons, limes and similar fruits with milk of lime. It should first be powdered fine, and when treated in aqueous solution with the alkali metal salt, the solution should be agitated, and, as already stated, the solution must be kept below a temperature of 30° C. After the reaction has gone to completion and the calcium carbonate has been precipitated and removed the liquor may be evaporated to obtain solid sodium citrate.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention.

1. The method of making alkali metal citrate by dissolving calcium citrate in dilute ammonia and precipitating an insoluble calcium salt therefrom by the corresponding alkali metal salt, at a temperature below 30° C.

2. The method of making sodium citrate by dissolving calcium citrate in dilute ammonia and precipitating an insoluble calcium salt therefrom by the corresponding sodium salt at a temperature below 30° C.

Signed by me, this 17th day of January, 1920.

WALTER GLAESER.